United States Patent [19]

Wolf et al.

[11] Patent Number: 4,612,996
[45] Date of Patent: Sep. 23, 1986

[54] ROBOTIC AGRICULTURAL SYSTEM WITH TRACTOR SUPPORTED ON TRACKS

[75] Inventors: Rodney A. Wolf, Amherst Junction; Alan G. Zech, Viroqua, both of Wis.

[73] Assignee: Kimberly Hills, Ltd., Chicago, Ill.

[21] Appl. No.: 521,611

[22] Filed: Aug. 8, 1983

[51] Int. Cl.⁴ .............................................. A01B 69/00
[52] U.S. Cl. ...................................... 172/26; 104/165; 104/169; 105/29 R; 105/177; 901/1; 172/3
[58] Field of Search ..................... 172/2, 3, 23, 24, 25, 172/26, 742, 796; 104/88, 130, 169, 165; 105/29 R, 177; 901/1; 280/43.22, 43.23; 212/218

[56] References Cited

U.S. PATENT DOCUMENTS

| | | | |
|---|---|---|---|
| 1,195,851 | 8/1916 | Payne | 104/169 |
| 3,845,718 | 11/1974 | Rogers et al. | 104/130 |
| 4,161,987 | 7/1979 | Tolmer | 172/796 X |

FOREIGN PATENT DOCUMENTS

| | | | |
|---|---|---|---|
| 22834 | 6/1936 | Australia | 105/177 |
| 562825 | 12/1957 | Belgium | 172/26 |
| 2023332 | 12/1971 | Fed. Rep. of Germany | 172/26 |
| 2024755 | 12/1971 | Fed. Rep. of Germany | 172/26 |
| 2948531 | 6/1980 | Fed. Rep. of Germany | 172/26 |
| 1213046 | 10/1959 | France | 105/177 |
| 2420502 | 11/1979 | France | 212/218 |

Primary Examiner—Richard T. Stouffer
Attorney, Agent, or Firm—Niblack & Niblack

[57] ABSTRACT

A robotic tractor that travels on rails forming a grid over a crop field and automatically performs tasks in the field is described. The tractor is supported on extendable legs that carry dual tandem perpendicular wheel sets. A rotary implement bed supported by the tractor is adapted to carry implements.

5 Claims, 19 Drawing Figures

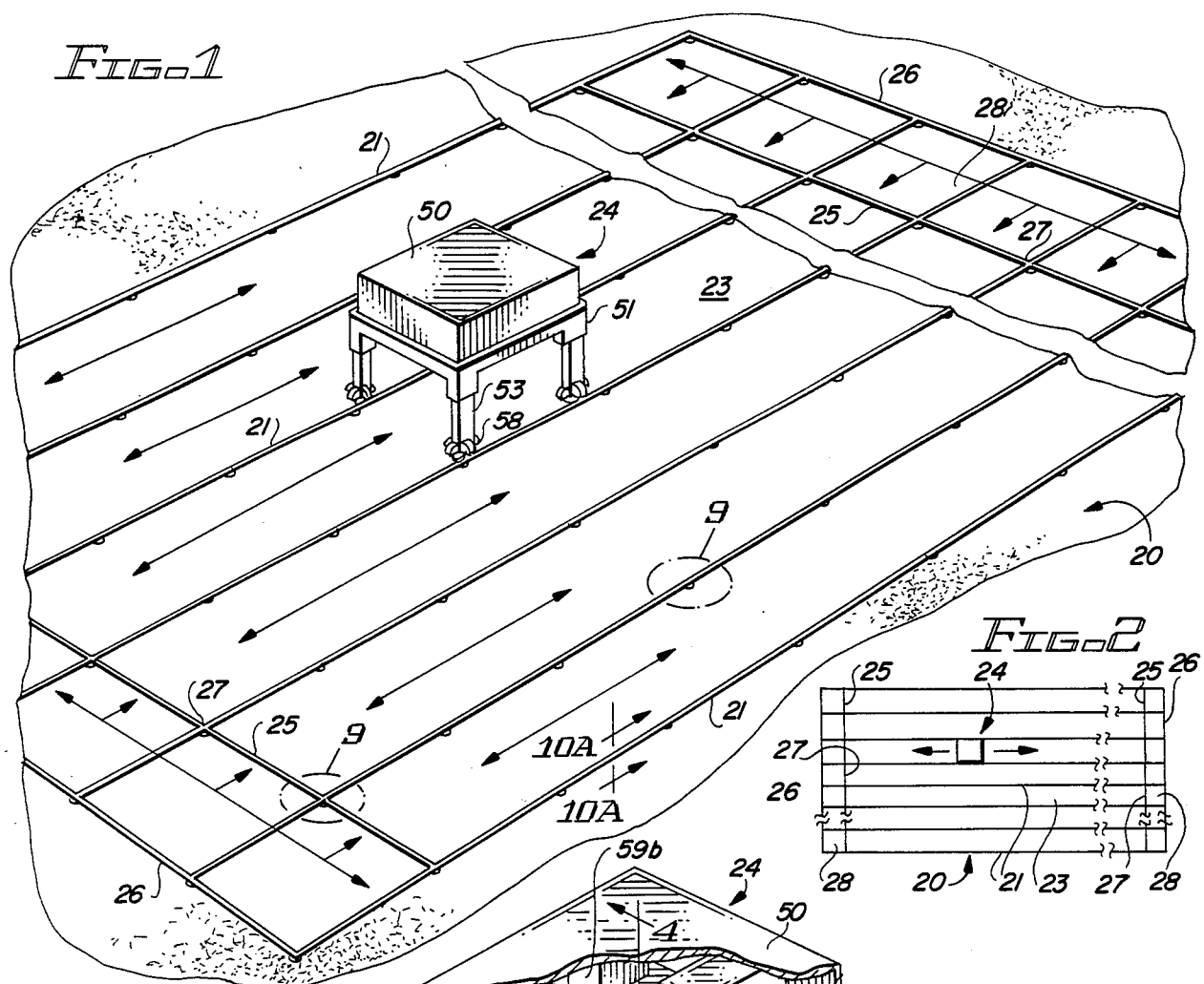
FIG.-1
FIG.-2
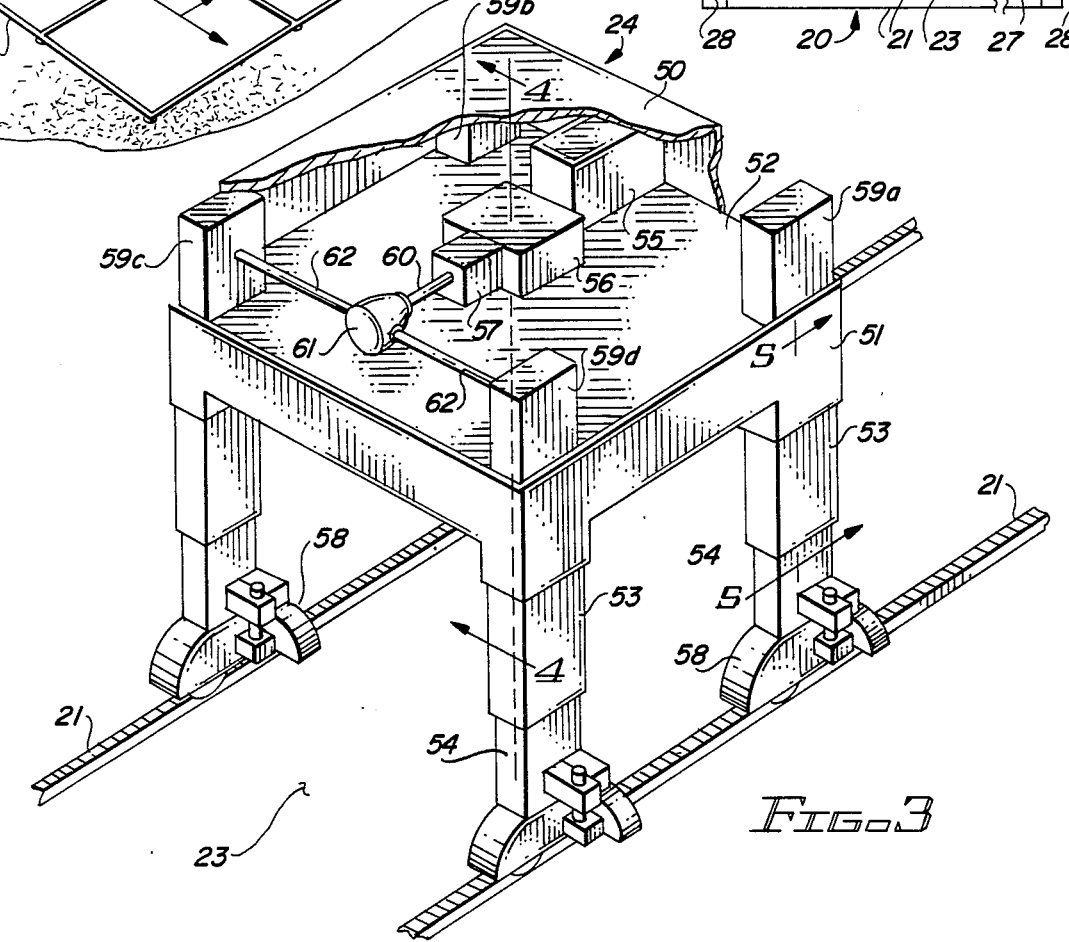
FIG.-3

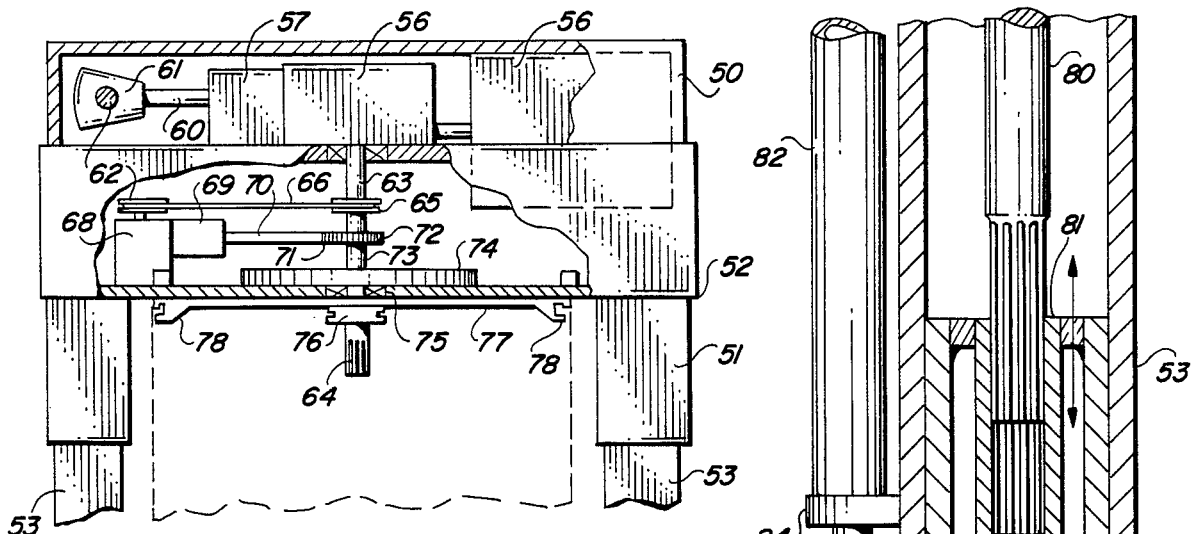
FIG.-4
FIG.-5
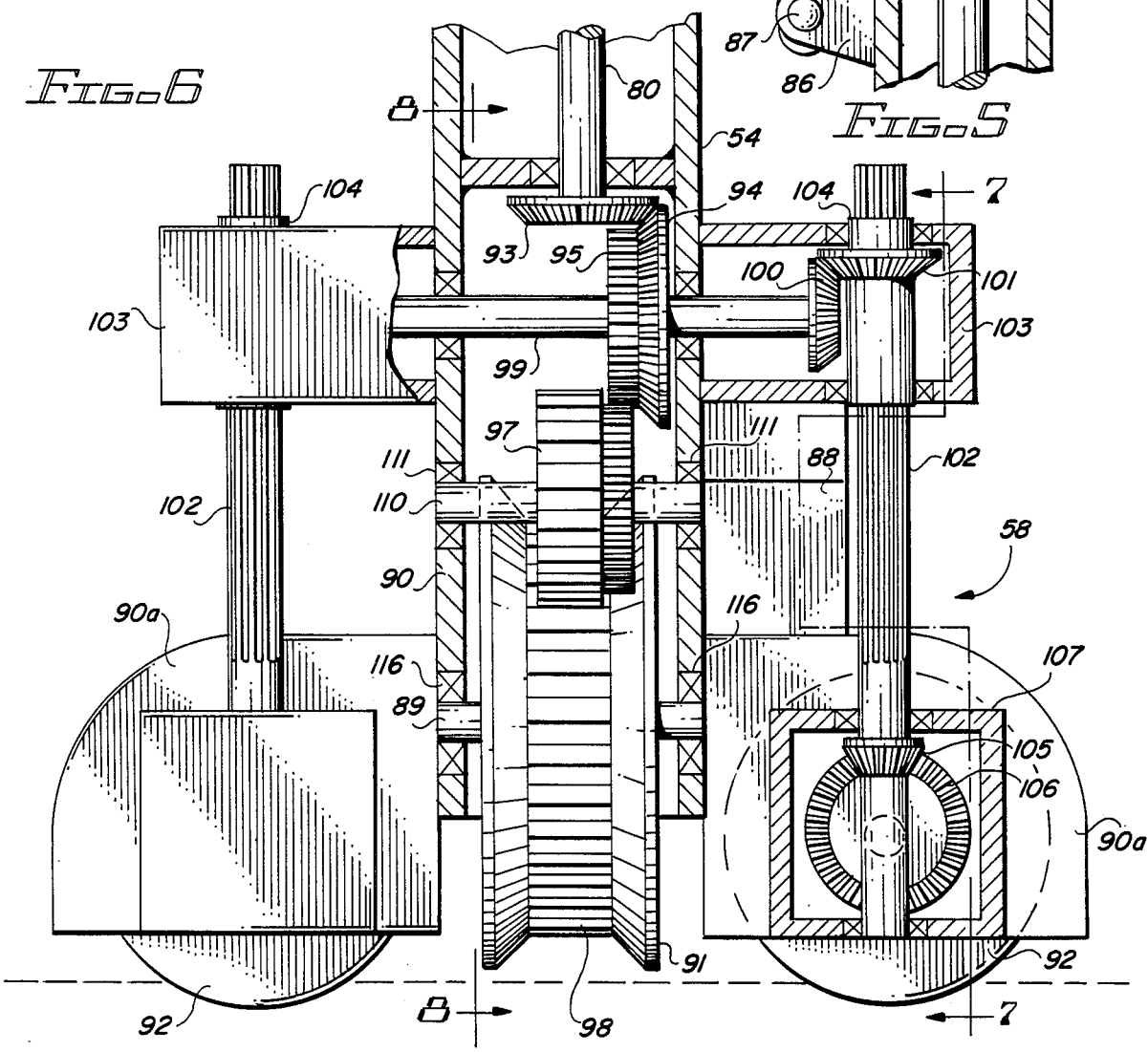
FIG.-6

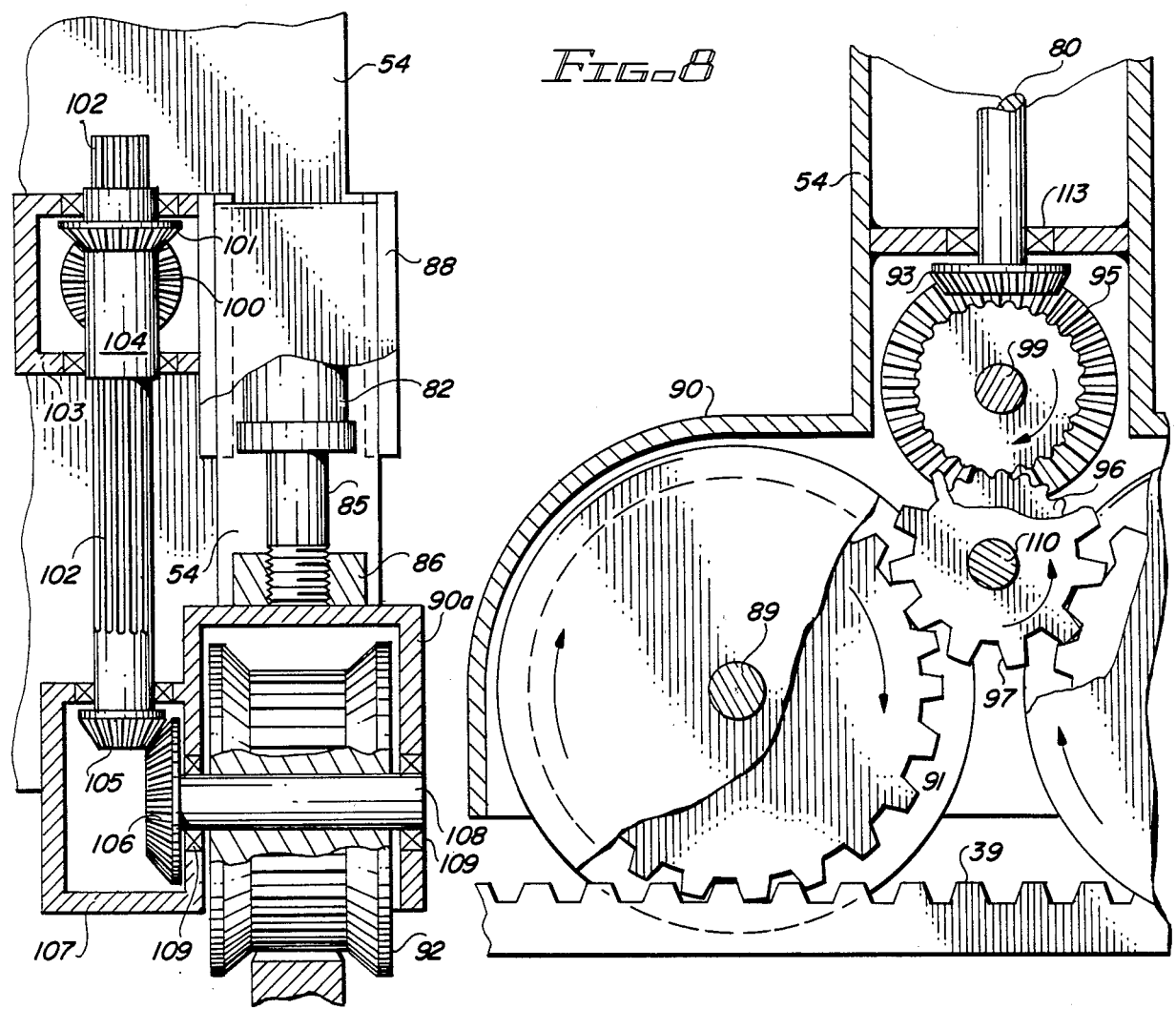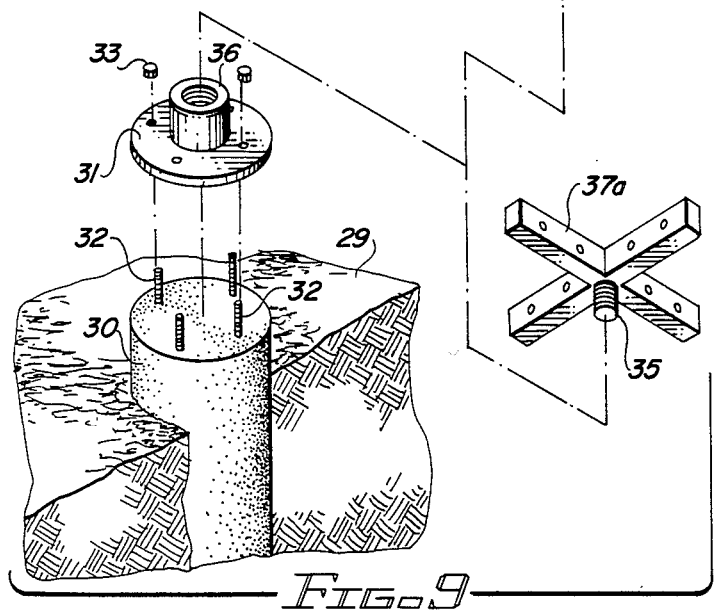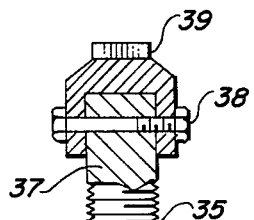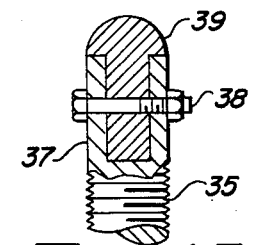

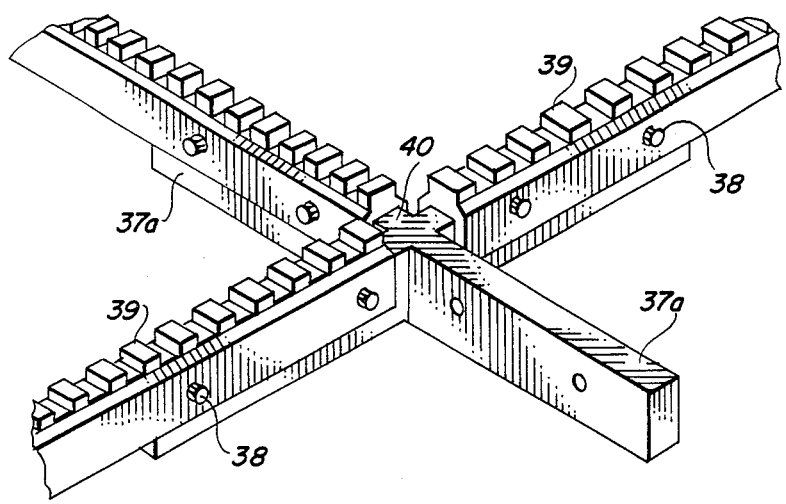
FIG.-11
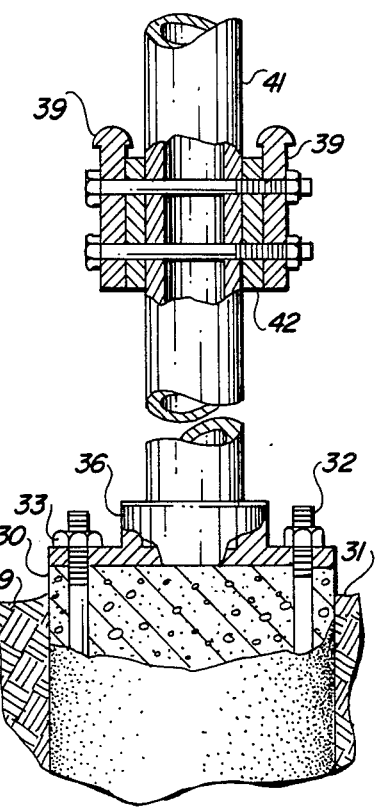
FIG.-13
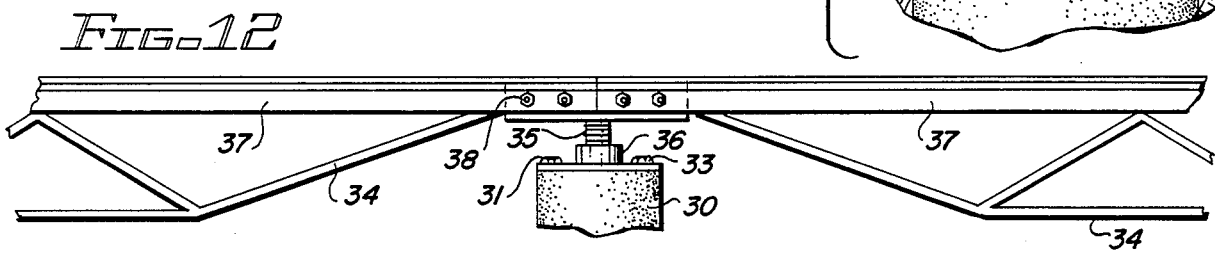
FIG.-12
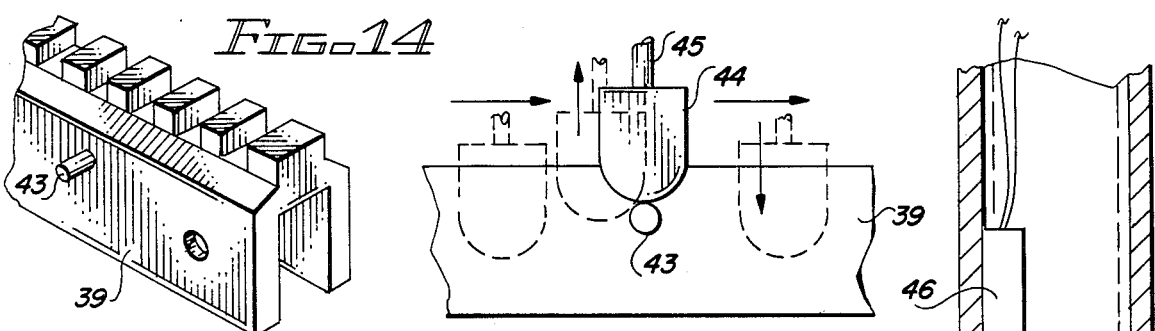
FIG.-14
FIG.-15A
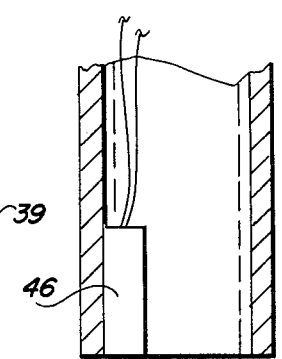
FIG.-16
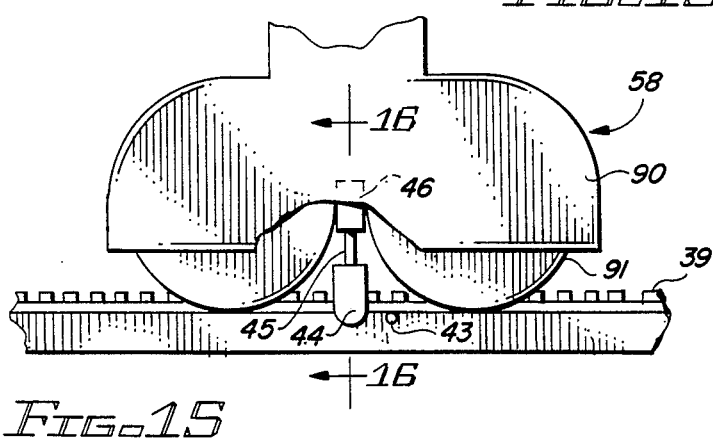
FIG.-15

ROBOTIC AGRICULTURAL SYSTEM WITH TRACTOR SUPPORTED ON TRACKS

BACKGROUND OF THE INVENTION

The present invention relates to automated farming and more particularly relates to a fully automated robot tractor and unique rail system.

Agricultural farming consists largely of treating large plots of soil and the plants that grow in them. This treatment may include tilling, sowing, fertilizing, cultivating, dusting or spraying, and harvesting. These functions are commonly achieved with specialized machines either mounted to or pulled by, or an integral part of a man-driven machine. While this technique has been working well for over 100 years, and has been developed to a high degree of technological sophistication, an automated farming system would be more efficient and cost effective, and free the farmer for other tasks.

A variety of automated tractors have been disclosed by the prior art. See for example, U.S. Pat. Nos. 3,186,493; 3,200,889; 3,324,593; 1,394,651 and 318,047. None, however, have met with widespread commercial success and the need for an efficient, economical robot tractor still exists. The present invention fulfills that need.

SUMMARY OF THE INVENTION

In summary, the present invention provides an automated agricultural system having a robot tractor moving on fixed tracks which form parallel rows over a crop field and which in turn have crossrows or columns interconnecting them at the end margins of the field. Very briefly the system includes the following: (a) straight horizontal parallel rows of paired, evenly spaced rails elevated over the expanse of an agricultural field; (b) a first pair of parallel spaced apart crossrow rails defining one end of said field and perpendicular to one end of said row rails; (c) a second pair of parallel spaced apart crossrow rails defining the other end of the field and perpendicular to the other end of the row rails; and (d) tractor means adapted to travel on paired rails over the field, the tractor including: (1) a carriage frame; (2) a leg suspended from each corner of the frame; (3) dual-conversion wheel assemblies secured to the lower end of each leg and serving to support the tractor frame for movement on the rails; (4) each of the wheel assemblies comprising a first pair of tandem wheels adapted for movement on the paired row rails, and a second pair of tandem wheels perpendicular and criss-cross to the first pair of wheels, the second pair of tandem wheels adapted for engagement and movement over the paired crossrails when the tractor reaches the end of a pair of row rails.

The tracks have periodic milestone markers that activate sensors in the tractor to control its operation. These markers comprise tab sensor projections located on the rails and a sensor cam carried by the tractor and contacting the tabs to cause activation of the tractor control system in response to milestone information received during travel on the rails.

Dual conversion wheel assemblies on the bottom of each of the four legs of the tractor are comprised of two in-line main wheels which ride on the row tracks of the system. A pair of smaller, perpendicular cross wheels oriented to travel at right angles to the main wheel sets are suspended in the air until they contact the columnar or crossrow tracks at the field ends so as to slightly raise the main wheel and the tractor frame to facilitate crossing of the row tracks when the tractor is being switched to another row over the field. The sensors preferably mounted in the wheel housings of the tractor legs respond to the track markers and activate a logic control system which commands the tractor or other vehicle riding on the tracks.

The tracks are positioned on footings attached to piles set into the field ground. Intersections of track, primarily at the end of rows where columnar crossrow tracks meet the row tracks, are depressed to facilitate crossing and eliminate wheel flange bump in either direction during crossing of the dual-conversion wheel assemblies.

When the vehicle is an implement bearing tractor, as opposed to a simple wagon or personnel carrier, the legs are extendable to allow the legs and hence the tractor frame to be raised and lowered over the crosstracks in operation. This allows for raising the implements over the crosstrack joints during switching from one row to another, as well as providing adjustment for the height of the crops being tended.

A rotary table is positioned axially in the tractor carriage frame which is moveably attached to the legs. The table houses a mounting plate on the underside of the carriage frame that carries implements used to cultivate the field. Power for orienting, changing or raising and lowering the implements is preferably supplied by a central splined power take-off shaft.

BRIEF DESCRIPION OF THE DRAWINGS

The present invention will be more readily understood from the following detailed description, taken in conjunction with the accompanying drawings in which:

FIG. 1 is a perspective view of an agricultural system of one embodiment of this invention, illustrating the reciprocal action of the tractor over row rails;

FIG. 2 is a top plan view of the field and tractor of FIG. 1;

FIG. 3 is a perspective view of the tractor assembly with parts cut away to aid in understanding.

FIG. 4 is a sectional view of the tractor top taken along line 4—4 of FIG. 3 with portions cut away for clarity and understanding;

FIG. 5 is a sectional view taken along line 5—5 of FIG. 3 with portions cut away to add clarification;

FIG. 6 is an elevational view of the dual-conversion wheel assembly with portions cut away for clarity and understanding;

FIG. 7 is a sectional view taken along line 7—7 of FIG. 6 with portions exposed showing an end view of the crossrow wheel assembly;

FIG. 8 is a partial cross-sectional view taken along line 8—8 of FIG. 6 showing one embodiment of the wheel assembly on cog rails;

FIG. 9 is an exploded view of a track pile assembly with alternative straight and cross track bases;

FIGS. 10A, 10B and 10C are elevational end views of rail surfaces attached to the rail base;

FIG. 11 is a perspective view of a rail base cross piece partially capped with cog railing;

FIG. 12 is an elevational view of a track section bottom reinforcement;

FIG. 13 is an elevational partial end view of a double track section suspended from a support pole with parts cut away to aid in illustrating the detail of one embodiment of the present invention;

FIG. 14 is a perspective view of a cogged rail cap with milestone tabs;

FIG. 15 is a perpective side view of a tandem wheel set with milestone tab sensor cam assembly;

FIG. 15A is an elevational view of a track tab and sensor cam with phantom views to add clarity;

FIG. 16 is an elevational view in cross-section taken along line 16—16 of FIG. 15.

DETAILED DESCRIPTION OF PREFERRED EMBODIMENTS

Referring to the drawings, FIG. 1 depicts a preferred layout of a track assembly 20 over an agricultural field. Horizontal margin rails 21 define row railway 23 while crossrails 25 and 26 define a columnar or cross row railway 28 having intersections 27 at each end of the agricultural field. Tractor 24 is supported by and rides on railway 23 over field 20. The tractor comprises carriage frame 51 with top 50 supported by legs 53 on wheel assemblies 58. As shown in FIG. 2, tractor 24 is positioned over and rides on row rails 21.

Referring to FIG. 3, automated tractor 24 comprises carriage frame 51 which carries top cover 50 supported by top posts 59a, 59b, 59c and 59d rigidly fastened to legs 53a, 53b, 53c and 53d, respectively. Each leg carries a dual-conversion wheel assembly 58 at its lower end. Dual-conversion wheel assembly 58 rests on rails 21 which rails are suspended above the field. The legs are moveably mated with inner leg sections 54a, 54b, 54c and 54d, respectively so that the legs and hence the carriage frame 51 height can be vertically raised and lowered.

As best shown in FIG. 3, suspended above the carriage frame 52 of the tractor is motor 55. The motor is attached to gear head 56 and transmission 57 which in turn is connected to drive shaft 60 which cooperates with differential 61. From there, connecting rod 62 extends through top posts 59c and 59d and thereafter to the vertical drive assemblies carried within the legs.

Referring to FIG. 4 which illustrates additional detail of the tractor top assembly, motor 55, gearhead 56, transmission clutch 57, drive shaft 60 and differential 61 is suspended above the carriage base plate 52. Descending from gearhead 56 is power take off shaft 63 passing through casing 73 and bearings 75 to terminate below base plate 52 as splined shaft end 64.

Attached to shaft 63 is pulley 65 motively connected by belt 66 to pump pulley 67. Hydraulic pump 68 is operably connected to cylinder 69 which is matingly attached to piston 70 carrying rack 71. Rack 71 engages pinion 72. Casing 73 is fixedly attached to pinion 72 which in turn is attached to rotary plate 74. Rotary plate 74 is supported above base plate 52 integrally attached through the plate to rotary bed 76 and implement mounting plate 77. Implement securing fitment 78 on plate 77 carries implements or appliances used in tending the crop field.

Legs 53 fixed to frame 51 carry hydraulic leg cylinders 82 within the legs. The hydraulic cylinders are fluidly connected to pump 68 by hydraulic line hose (not shown).

Referring to FIG. 5, the lower portion of leg cylinder 82 is attached to legs 53 and piston 85 is fastened by bracket 86 to inner leg 54. The upper portion of the cylinder is attached to an upper portion of leg 53 (not shown). Housed in leg 53 is wheel drive shaft 80 passing through journal 81 to the wheel assembly at the end of inner leg 54.

As best shown in FIG. 6, wheel drive shaft 80 carried in inner leg 54 mounts bevel gear 93 which engages crown wheel 94 joined to spur gear 95 mounted on center gear shaft 99 that also carries pinion bevel gear 100 engaging crown gear 101 fixed to propeller shaft 102 rotable within crosswheel journal 104 and encased in gear housing 103. Shaft 102 at its lower end carries pinion bevel 105 that engages crown driver 106 mounted on cross row wheel 92 within gear box 107 covered by secondary wheel housing 90A.

In the main or row wheel assembly, spur gear 95 meshes with spur wheel 96 fixed to drive gear 97 carried on drive gear axle 110 mounted on bearings 111 that rotate cog wheel 98 formed with row wheel 91 in turn carried by main wheel axle 89 mounted on bearings 116 cased within wheel housing 90. Hydraulic mounting box 88 is fastened to secondary wheel housing 90A.

In FIG. 7 an end view of the secondary wheel assembly with hydraulic extender is shown. The assembly is attached to inner leg 54 of the tractor perpendicular to the row wheel housings. Propeller shaft 102 carries crown gear 101 meshing with pinion bevel 100 through journal 104 within gear housing 103. Shaft 102 terminates in pinion bevel 105 engaged with crown driver 106 within gear box 107. Secondary wheel axle 108 is fixed to driver 106 on bearings 109 having cross row wheel 92 mounted thereon. Piston 85 fastened to wheel housing 90A is mated with hydraulic cylinder 82 encased in mounting box 88. Activated by fluid coupling from pump 68 (not shown) piston 85 extends the secondary wheel assemblies when they contact columnar rails, causing the tractor frame to be raised slightly and elevate the main wheels off the row tracks during switching from one row to another.

Referring to FIG. 8 which depicts a cog wheel embodiment of the main or row assembly, wheel shaft 80 is operably connected to main cog wheel 91 by bevel gear 93 meshed with spur gear 95 engaged with spur wheel 96 fixed to drive gear 97 meshed with the cog wheel 91 supported on rail 39.

As shown in FIG. 9, pile 30 is set in the ground 29 and carries fasteners 32 having footing 31 fastened to it by nuts 33. Fastening flange 36 attached to straight rail base 37 or crossrail base 37A by base bolt 35 mates with footing 31 to secure the base to the pier assembly.

FIGS. 10A–10C depict alternative rail cap sections 39. In FIG. 10A, a cogged rail cap 39 is fastened by track bolts 38 to rail base 37. In FIG. 10B, a smooth, crowned track cap is similarly fastened onto base 37. In FIG. 10C, an inverted V rail cap is shown.

A cross-section of track base partially capped with cog railing is depicted in FIG. 11. Depression 40 extends in all direction from the intersection. Cap 39 is fastened by track bolts 38 to cross track base 37A.

FIG. 12 shows the detail of alternative reinforcement of track spans. Pile 30 is set in the ground and carries footing 31 having flange 36 mated to track base bolt 35 fixed to rail base 37 capped with rail sections 39. Reinforcement struts 34 placed in triangular configurations make it possible to extend the spacings of piles 30.

In FIG. 13, a double raised track section illustrates track pole 42 carrying clamp 41 to position track sections 39. The pier assembly comprising the pile, footing and fasteners is the same as that of FIG. 9. This configuration is useful in elevating rails over depressed areas over a crop field.

In FIG. 14 a cogged rail track section carrying milestone tab 43 is shown. This is used to cap rail base sections such as those depicted in FIGS. 9 and 11.

As best shown in FIG. 15, the sensor assembly comprises plunger cam 44 fixed to plunger 45 connected to switch 46. The sensor assembly is attached to wheel housing 90 or 90A of dual conversion wheel assembly 58. In operation, milestone tab 43 (FIG. 15A) engages cam 44 during the passage of the wheel assembly along the track which causes plunger 45 attached thereto to be elevated to activate sensor switch 46 (FIG. 15). FIG. 16 illustrates tab 43 engaging cam 44 attached to switch 46 on rail 39.

Briefly, but in detail, the system preferably comprises the following elements: an array of straight, parallel rail sections extending the entire length of a crop field to be tended, the rails spaced so as to form tracks suitable for supporting and transporting a tractor positioned on them; a first pair of straight, parallel, spaced apart rail sections perpendicular to said rail sections which define crop rows defining a first end of said field; a second pair of straight, parallel, spaced apart rail sections perpendicular to the crop row rail sections defining a second end of the field; second perpendicular rail sections defining the length of the field and having an elevation over the field substantially the same as the parallel tracks and forming crossings with them; a tractor supported on the tracks and adapted to reciprocally travel back and forth across the field, with the tractor comprising: (1) a substantially rectangular carriage frame, the frame having a top cover and four spaced corners; (2) each corner having a leg extending downwardly from the frame to a lower mating leg portion which telescopes within each upper leg portion to alter the height of the tractor frame; (3) dual conversion wheel assemblies affixed to the bottom end of each lower leg portion and positioned on the rails, the wheels comprising perpendicularly criss-crossed pairs of tandem wheels, a first pair adapted for travel on the row tracks and a second pair adapted for travel on the crossrow tracks, one pair being suspended in space when the other pair is in contact with the tracks; (4) a rotary table mounted through the carriage frame having an integral implement mount at a lower portion thereof; (5) a sensing control system comprising tab sensor projections located on the rails and a sensor cam carried by the tractor and contacting the track milestone tabs thereby activating a tractor control system in response to milestone information received on contact with the tabs during travel on said rails; and (6) means for powering the tractor and attached implements.

Because the track asembly is the most expensive component of the present agricultural system, as it must cover vast areas, its design is based on maximum simplicity. All functions are performed by the tractor. No movable parts, curves, switches, turn-arounds or the like are used in the track layout. Change of tractor direction and function are completely performed within the vehicle itself. Relatively light-weight rails contructed of a small number of standard components which are supported by uniform and inexpensive piles or posts are used throughout the installation. Use of a very few components not only permits economies of scale and reduces costs, but it further simplifies the construction so as to enable non-specialists to install entire track arrangements without the necessity of employing construction craftsmen.

Regarding the piles used to support the rails over the field, while wood is the cheapest suitable material for the average installation, other obvious materials such as metals, concrete or plastic may be employed where desired. The use of wood has the advantage of simplifying anchoring of the rail footings to the pile tops, as by nailing. The tracks are constructed by fabricating two base components, straight sections and cross sections. These are fixed to the posts above the field and capped with standard one length track pieces. The track surface may be smooth or cogged. Various materials including aluminum, steel or plastic, for example, may be used. Steel is usually preferred for strength and cost but it has the disadvantage of generally requiring plating or alloying to reduce corrosion. Plastic tracks are normally reserved for greenhouse or similar lightweight setting.

The rails are laid in a pattern of rows and columns (rows and crossrows) over the entire useable expanse of the crop area. The rows are placed over the area in which the crops grow and crossrow tracks, normally needed only at the ends of the rows, provide access to them by allowing the tractor to travel over crossrows to other rows.

Basic characteristics of the track system in which the vehicles have rectangularly configured sets of wheels with flanges rendering them suitable for rail track travel include:

row pairs of rails elevated over and spanning the length of the agricultural field and defining the field width, the rails being straight and parallel for their entire length and each pair having a width equal to that of the vehicle wheel set width to thereby adapt the vehicle to being supported upon the tracks; crossrow pairs of rails perpendicular to and of equal elevation to the row rails to thereby form crossings therewith, one pair of tracks defining each length end boundary of the field, the width of the crossrow pairs being equal to that of the wheel set length of vehicles adapted to travel thereover;

depressions in the rail surfaces, the depressions extending in all directions from each crossing, the crossings having a depth about equal to that of the vehicle wheel flanges and having a depression length about equal to the diameter of the vehicle wheels.

The critical construction feature which must be observed is straight track sections having all rows and columns perpendicular to one another. Using that feature, almost any network pattern can be utilized. Either single or double rails may lie between any pair of rows. In general, a single rail centered on the piles is preferred but in some cases, as where a deep depression in the field must be spanned, a vertical pole 41 such as that depicted in FIG. 13 extends above the track, double rails 39 can be used. If the tractor is electrically powered, the rails may include insulated footings and joining members. In this event the power, such as 24 VAC (voltage alternating current), would be applied to the two rails of a column or crossrow. One rail of the end column would be electrically connected to every other row rail, while the other column rail would be connected to the alternate row rails. The row rails would, therefore, alternate in polarity and the tractor would always be in contact with the sides of the power circuit in any position. A simple arrangement of polarity sensors and reversing relays within the tractor would maintain correct polarity during all operations.

Row rails are joined to crossrow rails with cross joints which are insulated in case of electrified track operation. A depression at the intersection of all rail crossings is provided to permit smooth wheel travel in any direction. The depression which prevents wheel and flange bump during track crossings will be described in greater detail below.

A further feature of the track is the strategic placement of milestone tabs or projections which extend from the rails to engage position-sensing and navigational systems within the tractor. Because delivery of fluid materials such as water for irrigation is often desirable in cultivation of crops, the track network can be secondarily used to carry pipelines over the crop area.

The movement of the tractor over the tracks is without change in orientation. Once placed on the rails, the vehicle moves backward and foreward over the row rails or perpendicularly backward and forward on the crossrow tracks during row changes. While the term "tractor" usually refers to an all purpose vehicle equipped to carry implements which are rotatable and can be controlled in complex fashion, more basic vehicles such as wagons may follow a harvesting tractor of the present invention and collect harvest material. Such wagons do not require the implement mounting assemblies or the more elaborate control systems of the full tractor although they carry dual-conversion wheels, and track milestone sensing systems which are described in detail herein.

The slope and dimensions of the tractor frame are discretionary. Legs must be superimposed on the tracks as it is necessary that they be in contact with a pair of rails at all times. The implement assemblies suspended from the frame should extend across the path of movement of the tractor over the tracks. While the carriage frame has been described as being preferably rectangular, this is not necessary and sometimes not desirable. In the case of product carriers, i.e. harvest wagons, it may be preferable to provide self-dumping hoppers or oval frames having sides extending beyond the track margins. It may be desirable to enlarge such carrier vehicles so they extend over two or three rows and can consequently collect material from multiple tractors from which they are receiving product. In such cases, the top posts 59 (FIG. 3) may be eliminated to accomodate varying top cover or carriage arrangements.

While the full implement carrying tractor does not change orientation during its passages around the field being tended, implements in operation cannot be held in a fixed position at all times. Thus the rotatable implement mount provides a means for reversing a plow or other implement as the tractor moves from one row to another and progresses back and forth over the different rows. The desired implement is mounted on the bottom of the mounting plate 77 using fitment 78. After traveling over one row of the field and completing the function of the tool in that area, the tractor responds to the track sensor tab signalling a row end. The legs of the tractor extend which raises the implement sufficiently to clear the end-track crossing 27 (FIG.). The secondary wheel sets 92 are lowered to contact the crosstracks 28 and the control system guides the tractor over the crosstracks to next desired set of row tracks 21 at which time the track sensor tabs 43 signal that fact. At that point, the tractor stops, the row wheels 91 contact the row rails 21, and the secondary wheels 92 retract. As the tractor advances over crossing 27, rotary plate 74 turns to cause reversal of the implement, and the legs are retracted to lower the carriage frame 51 and place the implement in use in operating position over the filed. The tractor then moves over the new row.

The construction of specialized implement-bearing vehicles can often be simplified. While the all-purpose tractor requires the rotary bed to reorient a cultivator or plow, for example, on reverse trips across the field, this is not necessary with some implements. A disc or spike harrow, as distinguished from a spring harrow, or spraying apparatus, can be permanently positioned for back and forth operation so that reorientation is not necessary. This obviates the need for the rotary mount.

With most implements including those extending to ground level below the tractor frame and thus below the horizontal plane of the track tops, it is necessary to use the leg lifting assembly to allow passage of the implement over the crosstracks when switching. With many implements including spray equipment or dry fertilizer broadcasting assemblies, these can be designed to be fixed above the track surface to eliminate the need for carriage height adjustment during operation.

The dual-conversion wheel assemblies are critical to the tractor operation with the all straight and perpendicular track pattern employed in the practice of this invention. The depressions 40 (FIG. 11) provided at each crossing 27 have the following dimensions. The wheel assemblies 91 and 92 consist of the two wheel sets described above, each pair in tandem and perpendicular or criss-cross to one another. Crossing depressions must be of suitable length to allow one wheel to be supported on the rail surface at all times as the other tandem wheel passes over the depression. This construction allows the other wheel set which is suspended in the air at either side of the rail over which the tractor is then moving to cross through the rail intersection without bumping the crossrail. As described above, the secondary wheel set is carried in a retracted position as it rides beside the row tracks or when the tractor is switched to the column or crossrow tracks, the wheel set 92 is extended, preferably by hydraulic force, causing the main wheel set 91 to be lifted off the row rails.

Power is supplied to the carriage and implements by the central splined shaft or power take off shaft 63. This shaft supplies rotary power while the carriage is being positioned as well as when the tractor is moving. Supplemental electrical, hydraulic or other power sources may be used and are clearly within the scope of this invention. Power is preferably supplied to the rotary table by hydraulic pressure generated by pump 68 actuating the rack and pinion 71 and 72.

Any conventional drive means may be employed in the practice of this invention. A conventional engine, such as an electric motor or internal combustion engine of sufficient size and capacity to drive the tractor may be employed. It is preferable to attach the drive means to the underside of tractor carriage top 50 as shown in the drawings. Various arrangements of clutches, transmissions and speed reduction mechanisms may be employed. Such mechanisms are well known in the art. Locomotion of the tractor can be accomplished by using any number of drive wheels. It is discretionary whether one, two, three or four drive wheels are employed. Where two to four drive wheels or cog wheels are incorporated, a differential gear assembly 61 is preferred to prevent mis-synchronization of rail cogs to wheel cogs.

Preferably, small sensors such as electrical momentary switches 46 mounted to the wheel housings are supplied to activate the control means of the tractor. However, this positioning is simply for convenience. The milestone tabs 43 are linked to a logic control to achieve the desired tractor functions such as: go; stop; slow down; raise carriage; lower carriage; lower secondary wheels; engage row wheels; disengage column wheels; rotate implement mount, and the like. Computor or electromechanical integration of the milestone count and directional changes allow the tractor to seek and identify any location and perform a needed function at that point.

It is often desirable to provide some flexibility to the wheel assemblies. This may be accomplished by attaching them to an inner leg that slides up and down within the main leg instead of attaching the dual-conversion wheel sets directly to the main tractor leg. A splined two-part drive shaft within the leg permits the sliding action. A compression spring of the desired tension may then be placed above the inner leg.

Although embodiments of the invention have been shown and described herein, it is to be understood that various modifications and substitutions may be made by those skilled in the art without departing from the novel spirit and scope of the invention.

The invention claimed is:

1. A robotic agricultural assembly comprising:
   rail tracks with means on the bottom of said tracks for suspending said tracks above substantially the entire area of a crop field, said tracks being straight and parallel over their length and defining parallel rows;
   a first pair of spaced apart, parallel tracks perpendicular to said rail tracks and having substantially the same elevation as said rail tracks and defining a first end margin of said parallel rows;
   a second pair of spaced apart, parallel tracks perpendicular to said rail tracks and having substantially the same elevation as said rail tracks and defining a second end margin of said parallel rows;
   a robot tractor positioned on said tracks and adapted to reciprocally travel over the rail tracks and switch between adjacent pairs of said rail tracks by moving over said perpendicular tracks at the end of each row defined by said rail tracks;
   said tractor including a carriage frame having a leg suspended from each corner thereof, each of said legs comprising an upper portion fixed to the carriage frame and a lower moveable portion, elevating means attached to and cooperating with said upper and lower leg portions to expand and contract the length of the tractor legs whereby said carriage frame height can be varied, each of said tractor legs having a first set of tandem wheels attached to a bottom portion of the lower leg portion and which travel over said rail tracks and a second set of tandem wheels perpendicular and criss-cross to said first set of wheels and which travel over said perpendicular tracks to reach an adjacent pair of said rail tracks when said tractor reaches the end of one row defined by said rail tracks;
   said second set of tandem wheels being retracted when said tractor is riding over said rail tracks;
   said first set of tandem wheels being retracted when said tractor is riding over said perpendicular end tracks;
   said wheels having flanges for travel over said tracks;
   said tracks comprising uniform length units of straight track and perpendicular crosses of intersectional track having depressions at their intersections of sufficient length that when the tractor tandem wheels meet one of the depressions during travel, one of said tandem wheels is in said one of said depressions while the other wheel is supported by the tracks, thereby avoiding interrupted horizontal movement as each wheel crosses said track intersection.

2. A robotic agricultural assembly according to claim 1 wherein said tractor carriage frame is substantially rectangular and supports a rotary table axially carried in a center portion of said frame, said table having agricultural mounting means carried on the underside of said table and below said frame and an implement useable to tend said field is attached and rotatably carried on said mounting means.

3. A robotic agricultural assembly of claim 2 wherein said rotary table comprises a horizontal top plate supported on said carriage frame and positioned above the carriage frame, a horizontal integral mounting plate attached to said top plate and having an opening at its center and positioned below said frame, and a perpendicular shaft rotatable on its vertical axis centered through said rotary table and cooperating therewith to drive said rotary table.

4. An agricultural mechanized system comprising the assembly of claim 1 wherein said tractor includes drive means for rotating the sets of tandem wheels and thereby independently powering said tractor.

5. A robotic agricultural system for automatically tending an agricultural field comprising:
   an array of straight, parallel row rail sections adapted to extend the entire length of a crop field to be tended, said rail sections including parallel tracks spaced apart so as to form tracks suitable for supporting and transporting a tractor positioned thereon, said parallel tracks defining rows;
   a first pair of straight, parallel, spaced apart crossrow rail sections perpendicular to said row rail sections, said perpendicular rail sections defining a first end of said rows;
   a second pair of straight, parallel, spaced apart crossrow rail sections perpendicular to said row rail sections defining a second end of said rows;
   said first and second perpendicular rail sections defining the length of said rows and having crossrow tracks substantially the same elevation as the row tracks and forming crossings with them;
   a tractor supported on said tracks and adapted to reciprocally travel back and forth across said field, said tractor comprising:
   (1) a substantially rectangular carriage frame, said frame having a top cover and four spaced corners;
   (2) each corner having an upper leg portion extending downwardly from said frame to a lower mating leg portion which telescopes within said upper leg portion to alter the height of said tractor frame;
   (3) dual conversion wheel assemblies affixed to the bottom end of said lower leg portions and positioned on said tracks, said wheel assemblies comprising perpendicularly criss-crossed pairs of tandem wheels, a first pair adapted for travel on said row tracks and a second pair adapted for travel on said crossrow tracks, one pair being suspended in space when the other pair is in contact with said tracks;
   (4) a rotary table mounted through said carriage frame having an integral implement mount at a lower portion thereof; and
   (5) means for powering said tractor and said implements.

* * * * *